United States Patent
Kim et al.

(10) Patent No.: US 8,441,521 B2
(45) Date of Patent: May 14, 2013

(54) METHOD AND APPARATUS FOR DETERMINING VIEW OF STEREOSCOPIC IMAGE FOR STEREO SYNCHRONIZATION

(75) Inventors: Yong-tae Kim, Seoul (KR); Sang-moo Park, Uijeongbu-si (KR); Dae-sik Kim, Suwon-si (KR); Jae-seung Kim, Yongin-si (KR); Jae-phil Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1227 days.

(21) Appl. No.: 12/263,507

(22) Filed: Nov. 3, 2008

(65) Prior Publication Data
US 2009/0207238 A1 Aug. 20, 2009

(30) Foreign Application Priority Data
Feb. 20, 2008 (KR) .................. 10-2008-0015446

(51) Int. Cl.
*H04N 13/04* (2006.01)

(52) U.S. Cl.
USPC ........................................... 348/51

(58) Field of Classification Search .............. 348/42–54; 382/154; 375/240.16
See application file for complete search history.

(56) References Cited

U.S. PATENT DOCUMENTS

| | | | | |
|---|---|---|---|---|
| 6,160,901 | A * | 12/2000 | Kage | 382/107 |
| 6,314,211 | B1 * | 11/2001 | Kim et al. | 382/285 |
| 6,384,859 | B1 * | 5/2002 | Matsumoto et al. | 348/43 |
| 6,757,444 | B2 * | 6/2004 | Matsugu et al. | 382/283 |
| 7,054,491 | B2 * | 5/2006 | McGuinness et al. | 382/209 |
| 7,679,641 | B2 * | 3/2010 | Lipton et al. | 348/51 |
| 7,907,150 | B2 * | 3/2011 | Shulman et al. | 345/629 |
| 7,925,049 | B2 * | 4/2011 | Zhu et al. | 382/103 |
| 8,179,448 | B2 * | 5/2012 | Chen et al. | 348/222.1 |
| 2006/0215903 | A1 * | 9/2006 | Nishiyama | 382/154 |

* cited by examiner

Primary Examiner — Chirag R Patel
(74) Attorney, Agent, or Firm — Sughrue Mion, PLLC

(57) ABSTRACT

Provided is a method and apparatus for determining stereo views of a stereoscopic image. The method includes: selecting a pair of first and second images from a pair of frames of the stereoscopic image, the pair of frames including a base view image and an additional view image. The method further includes determining which of the first image and the second image is the base view image and which of the first image and the second image is the additional view image based on a parallax between the pair of first and second images.

45 Claims, 12 Drawing Sheets

METHOD AND APPARATUS FOR DETERMINING VIEW OF STEREOSCOPIC IMAGE FOR STEREO SYNCHRONIZATION

CROSS-REFERENCE TO RELATED PATENT APPLICATION

This application claims priority from Korean Patent Application No. 10-2008-0015446, filed on Feb. 20, 2008, in the Korean Intellectual Property Office, and the disclosures of which are incorporated herein in their entirety by reference.

BACKGROUND OF THE INVENTION

1. Field of the Invention

Methods and apparatuses consistent with the present invention relate to analysis of a view of a stereoscopic image and stereo synchronization, and more particularly, to stereo synchronization used to reproduce a stereoscopic image in a display device based on precisely displaying the stereoscopic image comprising images each having a different view.

2. Description of the Related Art

Stereo sync information indicating a degree of synchronization of a stereoscopic image is needed to reproduce the stereoscopic image. Stereo sync indicates whether a current image is a left view image or a right view image.

Image data only is input into a display device in order to reproduce a three-dimensional (3D) image. Most 3D image content that is currently manufactured and distributed contains left and right view image data but does not include a flag indicating whether a current frame is a left view image or a right view image. In more detail, since only the image data is transmitted when the stereoscopic image is transmitted to the display device, the display device cannot know whether the current frame is the left view image or the right view image.

Although a terminal has been developed to output stereo sync from graphic hardware such as a graphic card, the terminal is not employed in most currently available products, and if employed inflates costs due to a requirement for extra hardware.

FIG. 1 is a diagram for explaining a relationship between a video format conversion device 110 and a display device 120. Referring to FIG. 1, a stereoscopic image reproduction system 100 comprising the video format conversion device 110 and the display device 120 converts input left and right view images into a stereoscopic image in a display input format depending on the properties of the display device 120. The display device 120 receives the converted stereoscopic image and reproduces a 3D image having a stereo image effect.

Although stereo sync information of the stereoscopic image may be stored in the properties of the display device 120, a cable other than an output cable such as a digital visual interface (DVI) port is necessary for transmitting the stereo sync information, and as specific hardware is required, there is a strong possibility that it may not be supported.

SUMMARY OF THE INVENTION

The present invention provides a method of analyzing a stereoscopic image and determining which of a stereo view each image included in the stereoscopic image is using a display device without an additional input cable of the display device.

The present invention also provides a method of internally generating stereo synchronization information based on a determined stereo view.

The present invention also provides a method of using disparity estimation, and a camera parameter in order to determine a more efficient stereo view.

The present invention also provides a method of reducing viewing fatigue and performing stereo synchronization of a stereoscopic image when stereo synchronization information is fixed.

According to an aspect of the present invention, there is provided a method of determining stereo views of a stereoscopic image, the method comprising: selecting a pair of first and second images from frames of the stereoscopic image, wherein the selected pair correspond to a base view image and an additional view image; and determining which of the first image and the second image is the base view image and which of the first image and the second image is the additional view image based on a parallax between the pair of first and second images.

The method may further comprise: synchronizing the frames of the stereoscopic image based on the determining of which of the first image and the second image is the base image and which of the first image and the second image is the additional view image.

An image may comprise a pair of frames of the stereoscopic image which are a base view image and an additional view image, and the selecting the pair of first and second images may comprise reconstructing the pair of the frames from the image; and selecting the pair of frames as the pair of first and second images.

The determining which of the first image and the second image is the base view image and which of the first image and the second image is the additional view image may comprise: performing a disparity estimation with regard to the pair of first and second images by using the parallax between the pair of first and second images and determining a disparity vector; and determining views of the first and second images based on the determined disparity vector.

The determining of the disparity vector may comprise: obtaining a differential image in which a difference between a value of each pixel of the first image and a value of each corresponding pixel of the second image is recorded; dividing the differential image into a plurality of blocks; and determining which of the plurality of blocks have a sum of absolute values of pixel values greater than a predetermined threshold value; and performing the disparity estimation with regard to the determined blocks.

The determining which of the plurality of blocks have a sum of absolute values of pixel values greater than a predetermined threshold value may comprise: determining which blocks have the sum of absolute values of pixel values greater than the predetermined threshold value among blocks other than a block including a left edge area and a right edge area of the differential image.

The performing of the disparity estimation may comprise: determining, in the first image and the second image, a current block location, a left block location that is shifted in parallel by a predetermined distance from the current block location to the left, and a right block location that is shifted in parallel by the predetermined distance from the current block location to the right, determining a first difference between pixels of the current block location of the first image and pixels of the left block location of the second image; determining a second difference between the pixels of the current block location of the first image and pixels of the current block location of the second image; determining a third difference between the pixels of the current block location of the first image and pixels of the right block location of the second image; comparing the first, second, and third differences; and determining directions of the disparity vector according to the comparison of the first, second, and third differences.

The determining of the directions of the disparity vector may comprise: if the third, second, and first differences are sequentially smaller, determining a direction of the disparity vector to be in a negative direction; and if the first, second, and third differences are sequentially smaller, determining the direction of the disparity vector to be in a positive direction.

The performing of the disparity estimation may comprise: determining, in the first image and the second image, a current line location with regard to pixels in a predetermined horizontal direction of the current block location and a search range including pixels that are shifted in parallel by a predetermined distance from the current line location in a left and right direction, determining differences between pixels of the current line location of the first image and pixels of a line location that is shifted in parallel from the current line location in a left or right direction within the search range of the second image; comparing the determined differences; and determining the disparity vector to be in a direction of a line having the smallest difference according to the comparison of the differences.

The determining of the disparity vector may comprise: performing the disparity estimation with regard to each of the a plurality of corresponding blocks of the first and second images based on the parallax between the plurality of blocks of the first and second images and determining a disparity vector for each of the plurality of corresponding blocks; counting the number of positive directions of the disparity vectors and the number of negative directions of the disparity vectors; and determining a disparity vector of the first and second images to be in a positive direction if there is a greater number of disparity vectors of the plurality of corresponding blocks which are in the positive direction, and determining a disparity vector of the first and second images to be in a negative direction if there is a greater number of disparity vectors of the plurality of corresponding blocks which are in the negative direction.

The determining of the views of the first and second images may comprise: when the stereoscopic image is obtained from a parallel camera, determining the first image as the base view image and the second image as the additional view image if the direction of the disparity vector is positive; and determining the first image as the additional view image and the second image as the base view image if the direction of the disparity vector is negative.

The determining of the views of the first and second images may comprise: when the stereoscopic image is obtained from a cross camera, with regard to a cross point of the cross camera, determining the first image as the base view image and the second image as the additional view image if the direction of the disparity vector of an area before the cross point is positive and the direction of the disparity vector of an area after the cross point is negative; and determining the first image as the additional view image and the second image as the base view image if the direction of the disparity vector of the area before the cross point is negative and the direction of the disparity vector of the area after the cross point is positive.

The determining of the views of the first and second images may comprise: when a perpendicular disparity occurs between the first and second images, determining that the stereoscopic image is obtained from a cross camera.

The determining of the views of the first and second images may comprise: detecting an occlusion region that is seen from one of the first and second images but is not seen from the other one of the first and second images because of being covered by a predetermined object; determining that one of the first and second images in which the occlusion region can be seen is obtained from a point camera of based and additional view sides in which the occlusion region can be seen; and determining the other one of the first and second images in which the occlusion region is not seen as the view image of the other one of the based and additional view sides in which the occlusion region is not seen.

The determining of which of the first image and the second image is the base image and which of the first image and the second image is the additional view image may comprise: extracting, from stereoscopic image data, a first camera parameter with regard to the first image from stereoscopic image and a second camera parameter with regard to the second image; extracting a first parallel translation matrix of the first image from the first camera parameter and a second parallel translation matrix of the second image from the second camera parameter; comparing a component x1 of the first parallel translation matrix and a component x2 of the second parallel translation matrix; and determining views of the first and second images according to the comparison result, wherein the first and second parallel translation matrices indicate how far spatially corresponding coordinates of the first and second images are away from each other with regard to a predetermined world coordinate.

The determining of the views of the first and second images may comprise: if the component x1 is greater than the component x2, determining the first image as the additional view image and the second image as the base view image; and if the component x2 is greater than the component x1, determining the first image as the base view image and the second image as the additional view image.

The method may further comprise: determining a current view arrangement order of the first and second images, and if the current view arrangement order is different from previous view arrangement orders with regard to a predetermined plurality of pairs of first and second images prior to the current pair of first and second images, synchronizing the stereoscopic image based on the previous view arrangement orders.

The synchronizing of the stereoscopic image may comprise: if the current view arrangement order is different from a previous view arrangement order with regard to a pair of previous first and second image, and if the view arrangement orders of a predetermined plurality of pairs of first and second images after the pair of current first and second images are identical to the current view arrangement order, synchronizing the stereoscopic image based on the previous view arrangement orders with regard to the current view arrangement order.

The synchronizing of the stereoscopic image may comprise: if a view arrangement order of a pair of first and second images after the predetermined plurality of pairs of first and second images is identical to the current view arrangement order, synchronizing the stereoscopic image based on the current view arrangement order.

The synchronizing of the stereoscopic image may comprise: if the stereoscopic image is reproduced subsequently after a reproduction of a 2D image, inserting a predetermined number of blank frames between a last frame of the 2D image and a first frame of the stereoscopic image; and synchronizing the stereoscopic image based on the view arrangement order of the pair of first and second images after the blank frames.

According to another aspect of the present invention, there is provided an apparatus for determining stereo views of a stereoscopic image, the apparatus comprising: an image selecting unit which selects a pair of first and second images from frames of the stereoscopic image, wherein the selected pair comprises a base view image and an additional view image; and a view determining unit which determines which of the first image and the second image is the base view image and which of the first image and the second image is the additional view image using a parallax between the pair of first and second images.

The apparatus may further comprise: a stereo synchronizing unit which synchronizes the frames of the stereoscopic image based on the determination of which of the first image and the second image is the base view image and which of the first image and the second image is the additional view image.

According to another aspect of the present invention, there is provided a computer readable recording medium having recorded thereon a program for executing the method of determining stereo views of a stereoscopic image.

BRIEF DESCRIPTION OF THE DRAWINGS

The above and exemplary aspects of the present invention will become more apparent by the following detailed description of exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described more fully with reference to the accompanying drawings.

Figure 1:
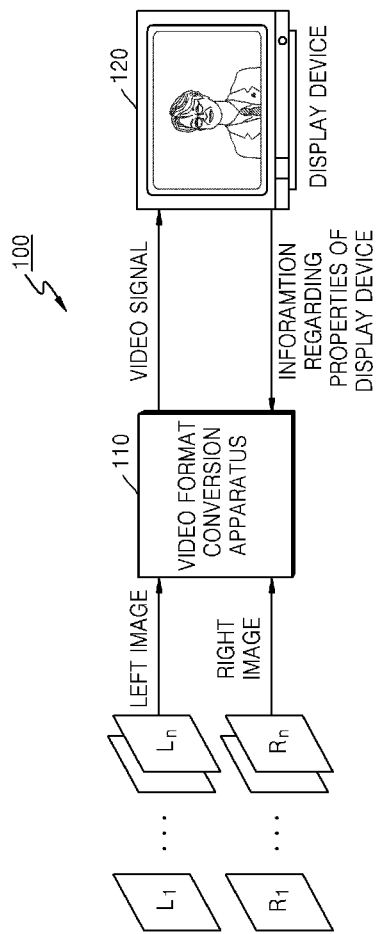
FIG. 1 is a diagram for explaining a relationship between a conventional video format conversion device and a conventional display device.
Figure 2:
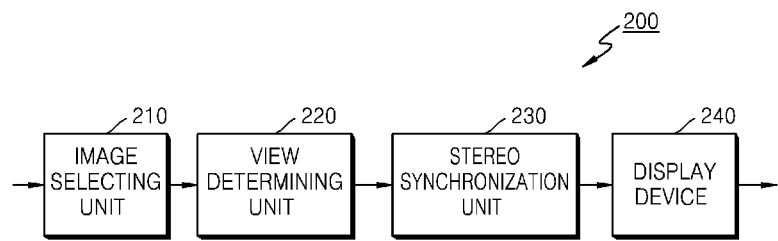
FIG. 2 is a block diagram of an apparatus for determining stereo views of a stereoscopic image according to an exemplary embodiment of the present invention.

FIG. 2 is a block diagram of an apparatus 200 for determining stereo views of a stereoscopic image according to an exemplary embodiment of the present invention. Referring to FIG. 2, the apparatus 200 for determining stereo views of the stereoscopic image comprises an image selecting unit 210 and a view determining unit 220 to determine stereo views of the stereoscopic image. The apparatus 200 for determining stereo views of the stereoscopic image comprises a stereo synchronization unit 230 and a display device 240 to perform stereo synchronization using the determined stereo views of the stereoscopic image.

The image selecting unit 210 selects a pair of a first image and a second image that are to be determined and which correspond to a pair of a base view image and an additional view image from the stereoscopic image, and outputs the selected first and second images to the view determining unit 220. In the present embodiment, a left view image may be used as the base view image, and a right view image may be used as the additional view image.

If all frames of the stereoscopic image that is input into the image selecting unit 210 are the base view image and/or the additional view image, then the input frames are alternatively defined to be a first image and a second image and then these are processed, and reproduced If the stereoscopic image that is input into the image selecting unit 210 is to include a frame of an image which is a combination of a pair of a base view image and an additional view image that correspond to each other, then a pair of a base view image frame and an additional view image frame are reconstructed from the frame of the image which is a combination of the pair of the base view image and the additional view image. The image selecting unit 210 selects the pair of first and second images that correspond to the reconstructed pair of base view image frame and additional view image frame.

The view determining unit 220 uses parallax between the pair of first and second images that are input from the image selecting unit 210 to determine the first image as one of the base view image and the additional view image, and the second image as the other one of the base view image and the additional view image. The determined view arrangement order is output to the stereo synchronization unit 230.

The determined view arrangement order means that the first and second image are determined in order of the left view image and the right view image or in the order of the right view image and the left view image.

The view determining unit 220 performs disparity estimation with regard to the first and second images, and determines whether each of the first and second images is the base view image or the additional view image based on an obtained disparity vector.

Although not shown, the view determining unit 220 comprises a differential image obtaining unit that obtains a differential image in which a difference between a value of each pixel of the first image and a value of each pixel of the second image is recorded, a block determining unit that determines a block in which a sum of absolute values of pixel values is greater than a predetermined threshold value among blocks of the differential image, and a disparity estimation performing unit that performs a disparity estimation with regard to the determined block. The detailed operation of the view determining unit 220 will be described with reference to FIGS. 3 through 10.

The view determining unit 220 determines each view of the first and second images using a camera parameter extracted from the stereoscopic image. A parallel translation matrix indicates how far spatially coordinates of the first and second images are away from each other with respect to a predetermined world coordinate.

Although not shown, the view determining unit 220 comprises a camera parameter extracting unit that extracts a first camera parameter with regard to the first image from the stereoscopic image and a second camera parameter with regard to the second image from the stereoscopic image, a parallel translation matrix extracting unit that extracts a first parallel translation matrix that is a parallel translation matrix of the first image from the first camera parameter and extracts a second parallel translation matrix that is a parallel translation matrix of the second image from the second camera parameter, and an x component comparing unit that compares a component $x_1$ that is an x component of the first parallel translation matrix and a component $x_2$ that is an x component of the second parallel translation matrix.

The view determining unit 220 determines views of the first and second images according to the result of the x component comparison. For example, if the component $x_1$ is greater than the component $x_2$, the first image is determined as the additional view image and the second image is determined as the base view image. Also, if the component $x_2$ is greater than the component $x_1$, the first image is determined as the base view image and the second image is determined as the additional view image.

The stereo synchronization unit 230 synchronizes the stereoscopic image based on the view arrangement order of the pair of first and second images that is input from the view determining unit 220, and outputs the synchronized stereoscopic image to the display device 240.

The stereo synchronization unit 230, in response to an abrupt change in the view arrangement order, compares a current view arrangement order with regard to a pair of current first and second images, a previous view arrangement order with regard to a pair of previous first and second images, and a next view arrangement order with regard to a pair of next first and second images, i.e., three view arrangement orders of three pairs of images, and then performs stereo synchronization with regard to the stereoscopic image. The operation of the stereo synchronization will be described in more detail with reference to FIGS. 11 and 12.

If the stereoscopic image is input after a two-dimensional (2D) image, the stereo synchronization unit 230 inserts a blank frame in order to reduce a viewer's viewing fatigue due to an abrupt change in a reproduction mode. The detailed description thereof will be described with reference to FIG. 13.

The display device 240 reproduces the synchronized stereoscopic image that is input from the stereo synchronization unit 230. The display device 240 may reproduce the stereoscopic image that is synchronized according to the apparatus 200 for determining stereo views of the stereoscopic image without additional stereo synchronization information of stereoscopic image data.

Figure 3:
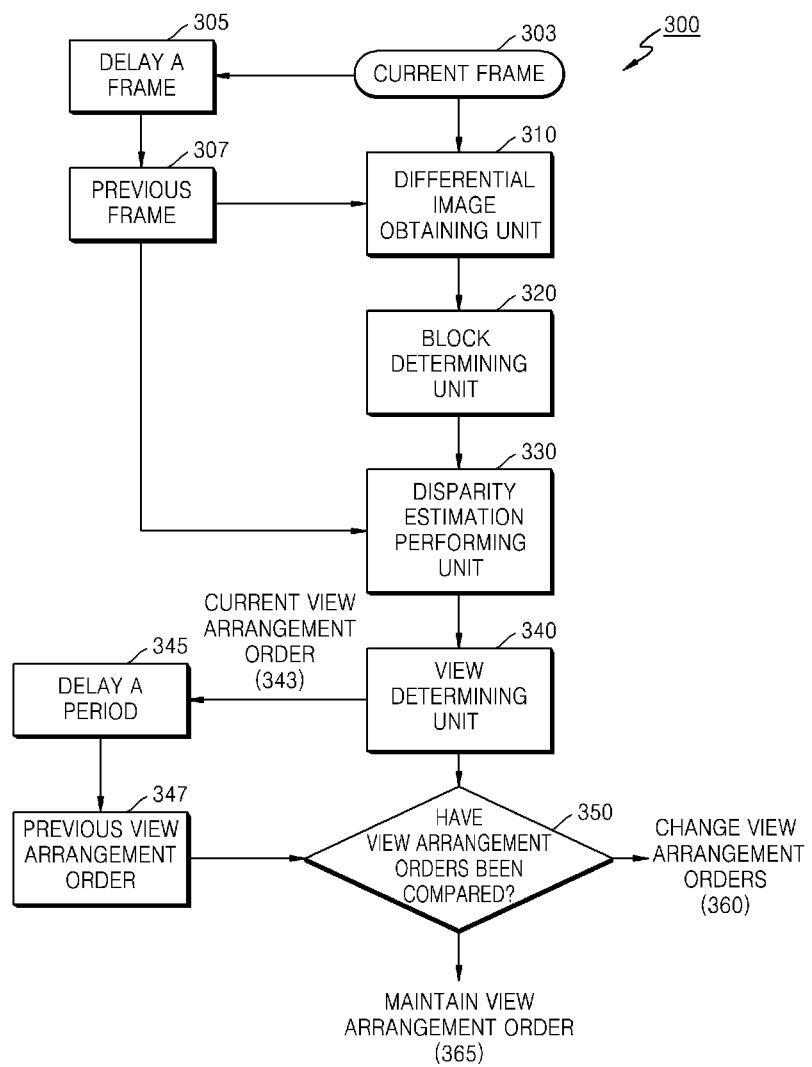
FIG. 3 is a detailed block diagram of an apparatus for determining stereo views of a stereoscopic image according to another exemplary embodiment of the present invention.

FIG. 3 is a detailed block diagram of an apparatus 300 for determining stereo views of a stereoscopic image according to another exemplary embodiment of the present invention. In the present exemplary embodiment, each frame of the stereoscopic image is one of a base view image or an additional view image.

The image selecting unit 210 receives a current frame 303 and delays a frame (305) with regard to the current frame 303 to obtain a previous frame 307. The current frame 303 is selected as the second image. The previous frame 307 is selected as the first image.

The apparatus 300 for determining stereo views of the stereoscopic image comprises a differential image obtaining unit 310, a block determining unit 320, a disparity estimation performing unit 330, and a view determining unit 340. The differential image obtaining unit 310 obtains a differential image showing a difference between each pixel value of the first image and each pixel value of the second image. The block determining unit 320 determines a block for determining a disparity vector from among blocks of the differential image. The disparity estimation performing unit 330 performs a disparity estimation with regard to the block determined by the block determining unit 320 and obtains the disparity vector. The view determining unit 340 determines whether the first and second images are base view images or additional view images using direction of the disparity vector obtained by the disparity estimation performing unit 330.

The apparatus 300 for determining stereo views of the stereoscopic image compares (350) a current view arrangement order 343 of a pair of current first and second images and a previous view arrangement order 347 with regard to a pair of previous images that can be obtained by delaying (345) a frame with regard to the pair of the current images. The apparatus 300 for determining stereo views of the stereoscopic image determines whether to change (360) or maintain (365) the view arrangement order according to the determined view arrangement order.

Figure 4:
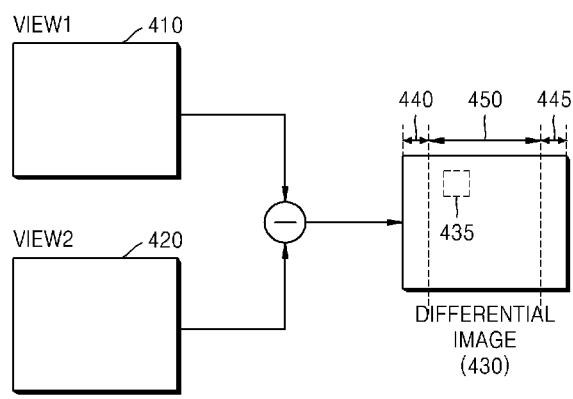
FIG. 4 is a diagram for explaining a method of obtaining a differential image and determining a block according to an exemplary embodiment of the present invention.

FIG. 4 is a diagram for explaining a method of obtaining a differential image and determining a block according to an exemplary embodiment of the present invention.

With regard to disparity estimation, it is highly possible for errors to occur in a smooth area of an image and for exact values to be obtained in an edge portion having many feature points. The view determining unit 220 performs the disparity estimation with regard to a differential image 430 between a first image 410 and a second image 420.

Since it is difficult to realize the apparatuses 200 and 300 for determining stereo views of the stereoscopic image in real-time when disparity estimation is performed with regard to all blocks of the differential image 430, the view determining unit 220 performs the disparity estimation with regard to a part of the differential image 430. In more detail, when the differential image 430 is divided into block units 435, a block in which pixel values of two images is highly different is selected in order to determine a disparity vector with regard to a block having a large disparity and many edge components.

$$Sum_{Resi} = \sum_{i,j \in block} |L(i,j) - R(i,j)| \qquad 1)$$

In Equation 1, a base view image and an additional view image are respectively a left view image L(i, j) and a right view image R(i, j). The first and second images 410 and 420 may be selected as one of the left view image L(i, j) and the right view image R(i, j). The view determining unit 220 calculates a sum of absolute values of differences between pixels of a block corresponding to a block of the first and second images 410 and 420, i.e., a sum $Sum_{Resi}$ of absolute values of pixel values of a block of the differential image 430.

The view determining unit 220 performs the disparity estimation with regard to a block having the sum $Sum_{Resi}$ of absolute values of pixel values of the block of the differential image 430 which is greater than a predetermined threshold value $TH_{Resi}$. If the threshold value $TH_{Resi}$ is low, the determining is more sensitive to a disparity between two views, and thus the number of operations is high. If the threshold value $TH_{Resi}$ is high, the determining is less sensitive to a disparity between two views, and thus the number of operations is lower.

The view determining unit 220 may not perform the disparity estimation with regard to left and right edge blocks 440 and 445 of an image in order to increase precision of the disparity estimation. Since the left and right edge blocks 440 and 445 of the image have a boundary occlusion block, they are not suitable for the disparity estimation. Therefore, the view determining unit 220 performs the disparity estimation with regard to the block having the sum $Sum_{Resi}$ of absolute values of pixel values of the block of the differential image 430 which is greater than the predetermined threshold value $TH_{Resi}$ in a block 450 excluding the left and right edge blocks 440 and 445 of the image.

Figure 5A:
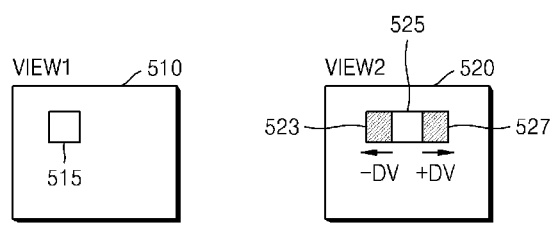
FIG. 5A is a diagram for explaining a method of estimating the disparity of each of a base view image and an additional view image by units of blocks according to an exemplary embodiment of the present invention.

FIG. 5A is a diagram for explaining a method of estimating each disparity of a base view image and an additional view image in a block unit according to an exemplary embodiment of the present invention. Referring to FIG. 5A, the view determining unit 220 selects a predetermined block location in order to determine direction of a disparity vector between a block of a first image 510 and a block of a second image 520. Since a current block location determined using the method of determining a block shown in FIG. 4 is a base, and base and additional views are left and right views, a relative disparity may be a disparity in left and right directions. The view determining unit 220 selects a first block location that moves in parallel by a predetermined distance from a current block location to the left, a second block location that is the current block location, and a third block location that moves in parallel by the predetermined distance from the current block location to the right. The predetermined distance of the left and right parallel movement is determined based on the quantity and precision of operation required.

The view determining unit 220 uses a difference between a block 515 of the current block location of the first image 510 and a block 523 of the first block location of the second image 520 as a sum of absolute difference (SAD) in order to find the direction of the disparity vector. In more detail, a first SAD value, which is an SAD value between the block 515 of the current block location of the first image 510 and the block 523 of the first block location of the second image 520, is determined.

A second SAD value, which is an SAD value between the block 515 of the current block location of the first image 510 and a block 525 of the second block location of the second image 520, is determined.

A third SAD value, which is an SAD value between the block 515 of the current block location of the first image 510 and a block 527 of the third block location of the second image 520, is determined.

Since the SAD is calculated in the first, second, and third block locations in the present exemplary embodiment, the efficiency of operation is higher than that of a conventional method of performing the disparity estimation with regard to the entire image. Since the SAD values are calculated in units of blocks instead of units of pixels, a more precise direction of the disparity vector is determined and is more effective in a parallel camera structure.

Figure 5B:
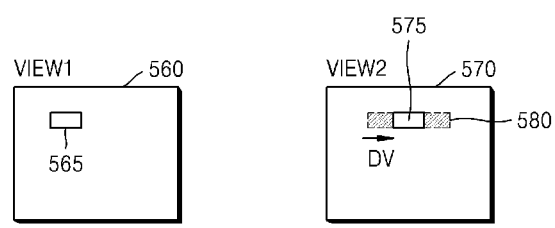
FIG. 5B is a diagram for explaining a method of estimating the disparity of each of a base view image and an additional view image in units of lines according to an exemplary embodiment of the present invention.

FIG. 5B is a diagram for explaining a method of estimating each disparity of a base view image and an additional view image in a line unit according to an embodiment of the present invention. Referring to FIG. 5B, the view determining unit 220 performs a disparity estimation in a line unit in order to increase the efficiency of operation compared to the disparity estimation in a block unit shown in FIG. 5A. A method of processing data in units of lines may be more advantageous to that in units of blocks in terms of a memory access of hardware.

The view determining unit 220 performs the disparity estimation in a line unit within a search range 580 between a pixel that moves in parallel by a predetermined distance from a current line location to left and a pixel that moves in parallel by the predetermined distance from the current line location to right. In more detail, SAD values of pixels in a line location that moves in parallel in a left or right direction in a pixel unit are determined within the search range 580 between pixels 565 of the current line location of a first image 560 and pixels 575 of the current line location of a second image 570.

Figure 6A:
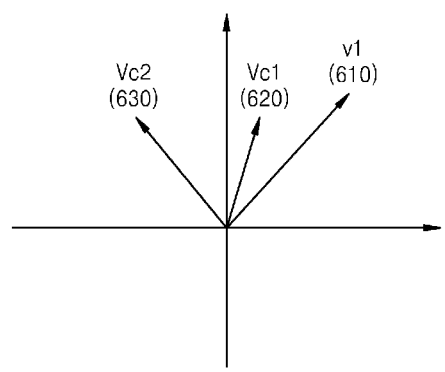
FIG. 6A illustrates vectors for explaining a unimodal error surface assumption (UESA) according to an exemplary embodiment of the present invention.

FIG. 6A illustrates vectors for explaining a unimodal error surface assumption (UESA) according to an embodiment of the present invention. Referring to FIG. 6A, the UESA is used to determine a direction of a disparity vector through a comparison of a plurality of SAD values. In order to obtain an approximation of two optional vectors $V_{c1}$ 620 and $V_{c2}$ 630 with regard to a current vector v1 610, a method of using the UESA will be described with reference to FIG. 6B.

Figure 6B:
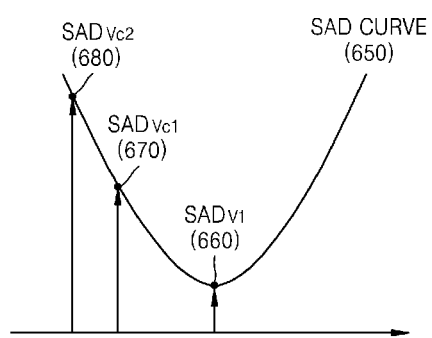
FIG. 6B is a diagram for explaining a method of determining the direction of a disparity vector through a UESA according to an exemplary embodiment of the present invention.

FIG. 6B is a diagram for explaining a method of determining the direction of a disparity vector through the UESA according to an embodiment of the present invention.

According to the UESA, an error value monotonically increases the farther the error value is away from a point where a whole area minimum error value occurs. Referring to FIG. 6B, $SAD_{v1}$ 660 that is a SAD value between the vector v1 610 and the vector v1 610, $SAD_{vc1}$ 670 that is a SAD value between the vector v1 610 and the vectors $V_{c1}$ 620, and $SAD_{vc2}$ 680 that is a SAD value between the vector v1 610 and the vector $V_{c2}$ 630 are distributed on a SAD curve 650. According to the UESA, the error value monotonically increases in the order of $SAD_{v1}$ 660, $SAD_{vc1}$ 670, and $SAD_{vc2}$ 680; therefore the error value increases in order of vector v1 610, $V_{c1}$ 620, and $V_{c2}$ 630.

The view determining unit 220 compares SAD values of blocks (lines) when performing the disparity estimation in block and line units shown in FIGS. 5A and 5B according to the UESA, and determines the direction of the disparity vector.

In more detail, if the first SAD value with regard to the first block location, the second SAD value with regard to the second block location, and the third SAD value with regard to the third block location monotonically increase in the disparity estimation in the block unit shown in FIG. 5A, a SAD value between the block 523 of the first block location of the second image 520 and the block 515 of the current block location of the first image is the smallest, and thus the disparity vector is determined in a negative (−) direction.

Likewise, if the first SAD value with regard to the first block location, the second SAD value with regard to the second block location, and the third SAD value with regard to the third block location monotonically decrease in the disparity estimation in the block unit shown in FIG. 5A, the disparity vector is determined in a positive (+) direction.

In the disparity estimation in the line unit shown in FIG. 5B, a direction in parallel to a predetermined line of the second image 570 having a smallest SAD with regard to the location 565 of the current line location of the first image 560 is determined as the direction of the disparity vector.

A method of determining the first and second images as base view images or additional view images according to the direction of the disparity vector will now be described with reference to FIGS. 7A through 9. A base view and an additional view are left and right views, respectively.

Figure 7A:
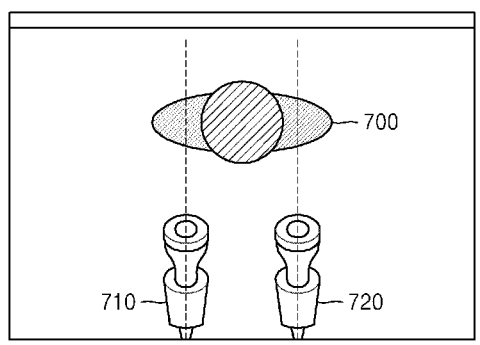
FIG. 7A illustrates an exemplary parallel type camera structure.

FIG. 7A illustrates a parallel type camera structure. Referring to FIG. 7A, a left camera 710 and a right camera 720 photograph a subject 700 in a stereo camera structure. The left camera 710 obtains a left view image. The right camera 720 obtains a right view image. Since the left camera 710 and the right camera 720 are disposed in parallel in the parallel type camera structure, a disparity vector between the left view image and the right view image is not inverted.

Figure 7B:
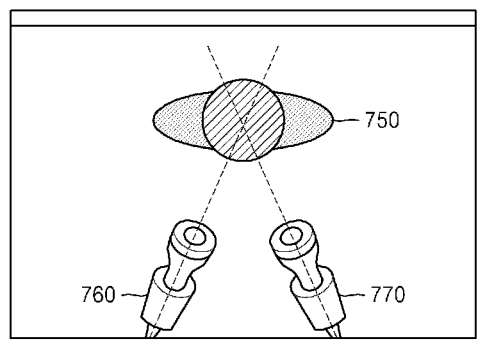
FIG. 7B illustrates an exemplary cross type camera structure.

FIG. 7B illustrates a cross type camera structure. Referring to FIG. 7B, a left camera 760 and a right camera 770 may face a subject 750 in a crossed arrangement in the cross type camera structure. Therefore, a disparity vector between a left view image and a right view image may be inverted.

Figure 8:
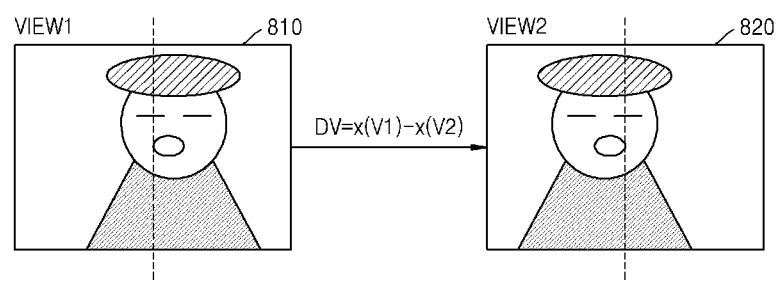
FIG. 8 is a diagram for explaining a method of determining a view according to the direction of a disparity vector in a parallel type camera structure according to an exemplary embodiment of the present invention.

FIG. 8 is a diagram for explaining a method of determining a view according to the direction of a disparity vector in a parallel type camera structure according to an embodiment of the present invention. Referring to FIG. 8, since the disparity vector is not inverted in the parallel type camera structure, it is possible to easily determine a view of a stereoscopic image if the direction of the disparity vector is known. In order to easily determine the view of the stereoscopic image in the parallel type camera structure, it is needed to be assumed that "when a point $V_1=(x_1,y_1)$ of a left view image and a point $V_2=(x_2,y_2)$ of a right view image correspond to each other, $y_1$ and $y_2$ are identical to each other with regard to a perpendicular component, and it is satisfied that $x_1>x_2$ with regard to a horizontal component".

According to this assumption, when a disparity vector DV is obtained on the condition that $x(V_1)-x(V_2)=x_1-x_2$, if the disparity vector DV is greater than 0, i.e., the disparity vector is disposed in a positive direction, a first image 810 is determined as a left view image, and a second image 820 is determined as a right view image.

Likewise, if the disparity vector DV is smaller than 0, i.e., the disparity vector is disposed in a negative direction, the first image is determined as the right view image, and the second image is determined as the left view image.

Figure 9A:
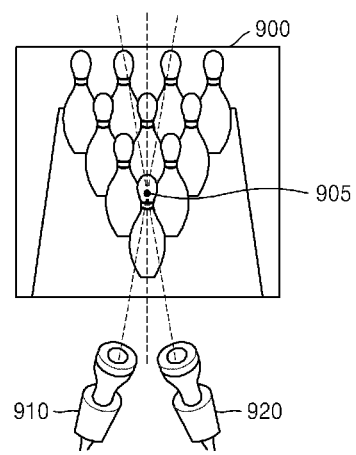
FIG. 9A illustrates view directions and a cross point in an exemplary cross type camera structure.

FIG. 9A illustrates view directions and a cross point in a cross type camera structure. Referring to FIG. 9A, when a left camera 910 and a right camera 920 photograph a subject 900, photographing view directions of the left camera 910 and the right camera 920 cross each other with regard to a line passing through the cross point 905. The photographing view directions of both left and right cameras 910 and 920 form the cross point 905.

Figure 9B:
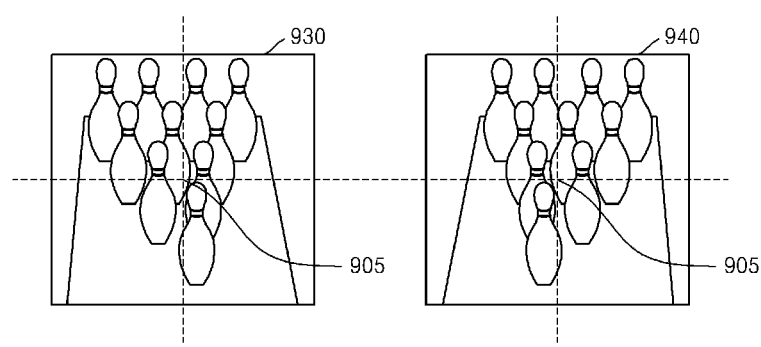
FIG. 9B illustrates images according to view in an exemplary cross type camera structure.

FIG. 9B illustrates images according to views in a cross type camera structure. Referring to FIG. 9B, the images are a left view image 930 photographed by the left camera 910 and a right view image 940 photographed by the right camera 920 in the cross type camera structure shown in FIG. 9A.

A bottom area of the cross point 905 of the left view image 930 is located right, whereas a top area of the cross point 905 is located left. Likewise, a bottom area of the cross point 905 of the right view image 940 is located left, whereas a top area of the cross point 905 is located right. In more detail, a perpendicular disparity occurs where top and bottom areas of an image are disposed in opposite directions with regard to a cross point.

When the perpendicular disparity occurs between a first image and a second image in the present embodiment, it may be determined that a stereoscopic image is obtained by a cross type camera.

Figure 9C:
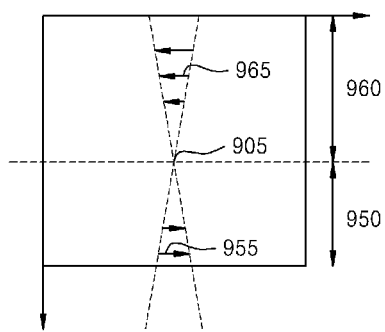
FIG. 9C illustrates directions of a disparity vector with regard to a cross point in an exemplary cross type camera structure.

FIG. 9C illustrates directions of a disparity vector with regard to a cross point in a cross type camera structure. Referring to FIG. 9C, the left view image 930 and the right view image 940 shown in FIG. 9B are disposed above and below in view of the cross point. If such phenomenon is applied to the disparity vector 955, the disparity vector 955 is disposed in a negative direction in an area 950 below the cross point 905, whereas the disparity vector 965 is disposed in a positive direction in an area 960 above the cross point 905. In more detail, the disparity vector between the left view image 930 and the right view image 940 is inverted with regard to the cross point 905.

Therefore, views of first and second images are determined based on the direction of the disparity vector according to the location of the cross point in the cross type camera unlike the parallel type camera. For example, if the disparity vector of an area before the cross point is disposed in a positive direction, and the disparity of an area after the cross point is disposed in a negative direction, the first image is determined as the left view image 930 and the second image is determined as the right view image 940. Likewise, if the disparity vector of the area before the cross point is disposed in the negative direction, and the disparity of the area after the cross point is disposed in the positive direction, the first image is determined as the right view image 940 and the second image is determined as the left view image 930.

Since a stereoscopic image obtained by the cross type camera has the same disparity vector direction in the parallel type camera structure between the cross point and the camera, views of two cameras can be determined in the same manner as in the parallel type camera structure.

Figure 10:
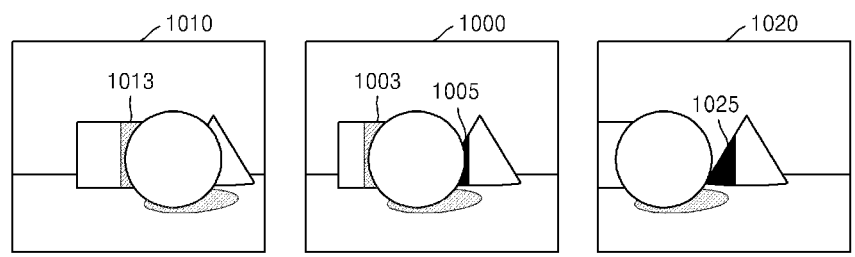
FIG. 10 is a diagram for explaining a method of determining views by using an occlusion region according to an exemplary embodiment of the present invention.

FIG. 10 is a diagram for explaining a method of determining views by using an occlusion region. Referring to FIG. 10, if a post-processing control process such as a process of parallel shifting of a left view image and a right view image is additionally performed, the assumption described with reference to FIG. 8 cannot be satisfied. The assumption is also not satisfied when complicated objects are entangled or the image is out of focus.

The view determining unit 220 uses the occlusion region for supplementing the method of determining views through the disparity estimation including the case where the assumption is not satisfied. The occlusion region refers to a region that is seen from a view but is not seen from another view. The occlusion region mainly occurs at boundary surfaces of an object.

A dark area 1003 of a hexahedron and a dark area 1005 of a cone are seen in a front image 1000 of the hexahedron, a sphere, and the cone. However, if a stereo camera photographs objects of the front image 1000 and obtains a stereoscopic image, a dark region 1013 is seen from the hexahedron disposed in left of the left view image, whereas a dark area of the hexahedron is not seen from the hexahedron of the right view image. In more detail, the dark area 1003 or 1013 of the hexahedron of the right view image is the occlusion region. Likewise, a dark region 1025 is seen from the cone disposed in right of the right view image, whereas a dark area of the cone is not seen from the left view image. In more detail, the dark area 1005 or 1025 of the cone of the left view image is the occlusion region.

Therefore, it is possible to supplement the method of determining views of the stereoscopic image using the occlusion region. If an area that is not seen from the first image is seen in a right area of an object from the second image with regard to boundary surfaces of the object, the second image is determined as the right view image, and the first image is determined as the left view image. Likewise, if an area that is not seen from the first image is seen in a left area of an object from the second image with regard to boundary surfaces of the object, the second image is determined as the left view image, and the first image is determined as the right view image.

The method of determining directions of the disparity vector is described above with reference to FIGS. 7A through 10. The view determining unit 220 determines the number of directions of the disparity vector and estimates a trend of the overall direction of all of the disparity vectors. The view determining unit 220 finally determines the view of the stereoscopic image in a direction having the greatest number of positive disparity vectors and negative disparity vectors among all the directions of the disparity vectors.

Figure 11:
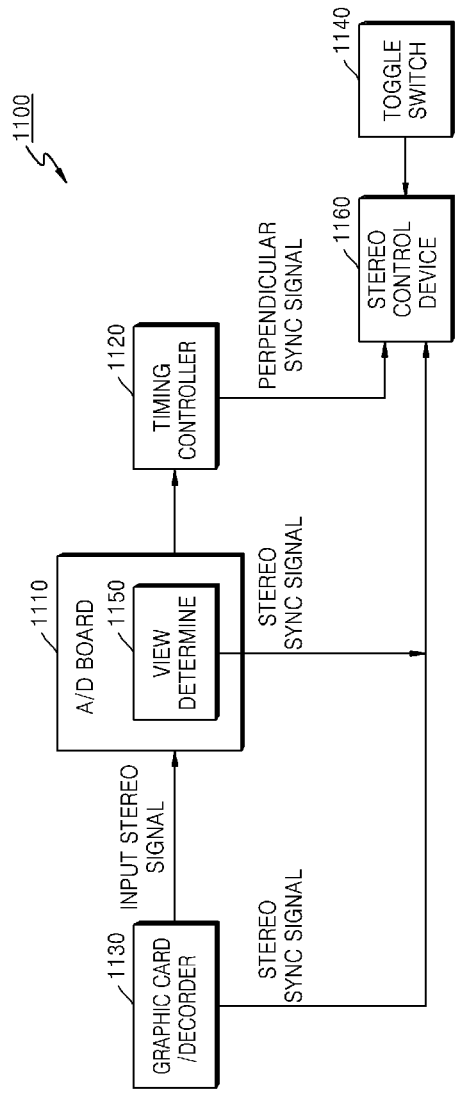
FIG. 11 is a block diagram of an apparatus for controlling stereo synchronization according to an exemplary embodiment of the present invention.

FIG. 11 is a block diagram of an apparatus for controlling stereo synchronization according to an embodiment of the present invention. Referring to FIG. 11, an apparatus 1100 for outputting a stereoscopic image comprises an A/D board 1110, a timing controller 1120, and a stereo control device 1160. The A/D board 1110 receives an analog stereoscopic image signal and converts the analog stereoscopic image signal into a digital stereoscopic image signal. The timing controller 1120 generates a perpendicular sync signal of the digital stereo image signal that is input from the A/D board 1110. The stereo sync signal can be obtained using various methods. The stereo control device 1160 controls stereo synchronization of the stereoscopic image using the perpendicular sync signal and the stereo sync signal.

A conventional stereo synchronization device generates the stereo sync signal in addition to the stereoscopic image signal through a graphic card and decoder 1130, and therefore requires an additional channel for transmitting an additional stereo sync signal. In a conventional toggle switch method, a toggle switch 1140 is required to be manually operated when a user desires and in order to convert to the stereo sync.

The apparatuses 200 and 300 for determining stereo views of the present invention analyze image data of the stereoscopic image signal that is input into a system in the view determining unit 1150, thereby synchronizing views of the stereoscopic image according to the determined views. Therefore, the apparatuses 200 and 300 for determining stereo views do not need an additional stereo sync signal transmission channel or the toggle switch 1140.

Figure 12A:
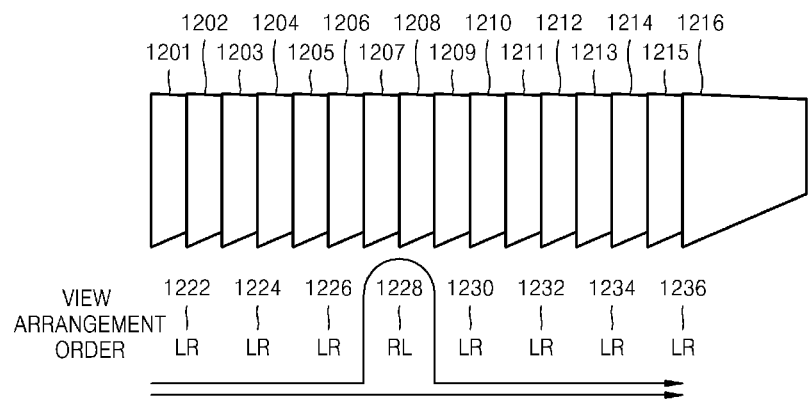
FIG. 12A illustrates stereoscopic images in which a view arrangement order abruptly changes.

FIG. 12A illustrates stereoscopic images in which a view arrangement order abruptly changes. Referring to FIG. 12A, when stereoscopic images 1201 through 1216 are sequentially processed, a view arrangement order of a pair of corresponding first and second images is analyzed. When the view arrangement order of the first and second images is left and right view images, the view arrangement order is indicated as LR. On the other hand, when the view arrangement order of the first and second images is right and left view images, the view arrangement order is indicated as RL.

A view arrangement order 1111 of the first image 1201 and a second image 1202, a view arrangement order 1224 of a third image 1203 and a fourth image 1204, a view arrangement order 1226 of a fifth image 1205 and a sixth image 1206, a view arrangement order 1228 of a seventh image 1207 and an eighth image 1208, a view arrangement order 1230 of a ninth image 1209 and a tenth image 1210, a view arrangement order 1232 of an eleventh image 1211 and a twelfth image 1212, a view arrangement order 1234 of a thirteenth image 1213 and a fourteenth image 1214, and a view arrangement order 1236 of a fifteenth image 1215 and a sixteenth image 1216 are LR, LR, LR, RL, LR, LR, LR, and LR, respectively.

In more detail, the view arrangement orders are maintained as LR for 1224, 1224, and 1226, are abruptly changed to RL for 1228, and are changed back to LR for 1230, 1232, 1234, and 1236. Such an abrupt change in the view arrangement order may result in viewing fatigue.

Figure 12B:
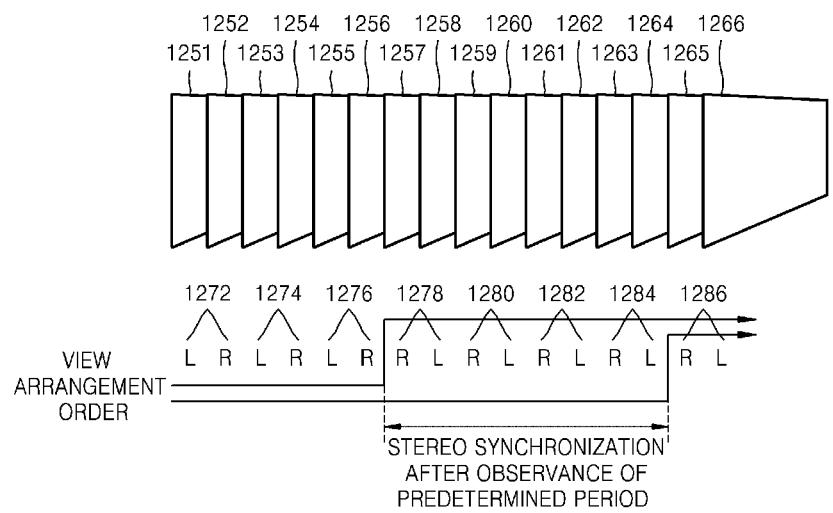
FIG. 12B is a diagram of a stereo synchronization unit according to an exemplary embodiment of the present invention.

FIG. 12B is a diagram of a stereo synchronization unit according to an embodiment of the present invention.

In order to prevent viewing fatigue due to an abrupt change in the view arrangement order, the stereo synchronizing unit 230 performs stereo synchronization of stereoscopic images based on a current view arrangement order, a previous view arrangement order, and a next view arrangement order.

Referring to FIG. 12B, a view arrangement order 1272 of a first image 1251 and a second image 1252, a view arrangement order 1274 of a third image 1253 and a fourth image 1254, a view arrangement order 1276 of a fifth image 1255 and a sixth image 1256, a view arrangement order 1278 of a seventh image 1257 and an eighth image 1258, a view arrangement order 1280 of a ninth image 1259 and a tenth image 1260, a view arrangement order 1282 of an eleventh image 1261 and a twelfth image 1262, a view arrangement order 1284 of a thirteenth image 1263 and a fourteenth image 1264, and a view arrangement order 1286 of a fifteenth image 1265 and a sixteenth image 1266 are LR, LR, LR, RL, RL, RL, RL, and RL, respectively.

Although the view arrangement orders are changed from LR for 1272, 1274, and 1276 to RL for 1278, the stereo synchronization unit 230 does not directly apply the changed view arrangement order to a stereo synchronization operation but observes a next view arrangement order during a predetermined period. For example, if the view arrangement order is changed (i.e. from LR for 1276 to RL for 1278), the view arrangement orders 1278, 1280, 1282, and 1284 of the four pairs of images 1257/12358, 1259/1260, 1261/1262, and 1263/1264 are observed, and the changed view arrangement order RL is maintained, the stereo synchronization unit 230 does not reflect the view arrangement order RL to the four pairs of images 1257/12358, 1259/1260, 1261/1262, and 1263/1264 but performs the stereo synchronization based on the view arrangement order RL 1286 of a pair of images 1265/1266.

The predetermined period that is observed for determining whether the changed view arrangement order is maintained may be short as perceived by a user although the stereo synchronization unit 230 does not perform the stereo synchronization according to an actual view arrangement order.

Figure 13:
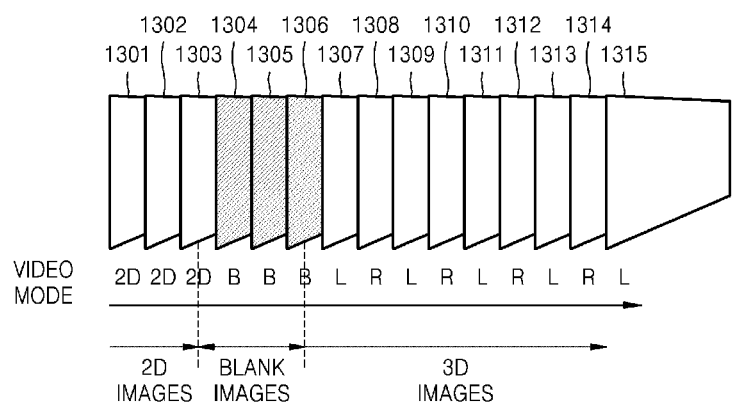
FIG. 13 is a diagram of a stereo synchronization unit according to another exemplary embodiment of the present invention.

FIG. 13 is a diagram of a stereo synchronization unit according to another exemplary embodiment of the present invention. Referring to FIG. 13, the apparatuses 200 and 300 for determining stereo views of the present invention analyze parallax from a stereoscopic image and determine views of the stereoscopic image. However, when the view arrangement order is already given, stereo synchronization will be performed according to the given view arrangement order.

Since a viewer feels fatigue if a reproduction of 2D images 1301, 1302, and 1303 is abruptly changed to a reproduction of 3D images 1307 through 1315, the stereo synchronization unit 230 inserts blank images 1304, 1305, and 1306 for a predetermined frame period between a 2D image period and a 3D image period in order to supplement an abrupt change in a view reproduction mode. The frame period into which the blank images 1304, 1305, and 1306 are inserted must be a period of time short enough so that the viewer does not notice the existence of the blank images 1304, 1305, and 1306.

The stereo synchronization unit 230 performs stereo synchronization according to the given view arrangement order when the blank images 1304, 1305, and 1306 finishes and when a reproduction mode of the 3D images 1307 through 1315 starts.

Figure 14:
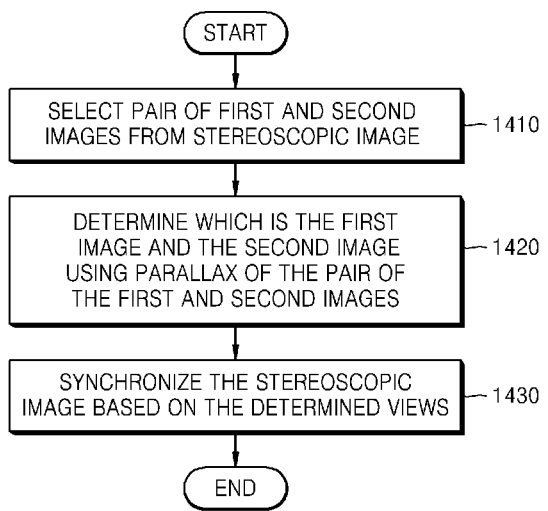
FIG. 14 is a flowchart illustrating a method of determining stereo views of a stereoscopic image according to an exemplary embodiment of the present invention.

FIG. 14 is a flowchart illustrating a method of determining stereo views of a stereoscopic image according to an exemplary embodiment of the present invention. Referring to FIG. 14, a pair of first and second images for a pair of a base view image and an additional view image that correspond to each other is selected from the stereoscopic image (operation 1410).

When a frame of the stereoscopic image is a base view image or an additional view image, the frame is selected as the first image or the second image. If a frame of the stereoscopic image includes base view image information and additional view image information, a frame of the base view image and a frame of the additional view image are reconstructed from the frame of the stereoscopic image, and the reconstructed frames of the base view image and the additional view image are selected as the first image or the second image.

A parallax of the pair of the first and second images is used to determine the first image as one of the base view image and the additional view image, and the second image as another of the base view image and the additional view image (operation 1420).

In the present embodiment, directions and angles of a disparity vector that are obtained by performing a disparity estimation with regard to the corresponding pair of images are used to determine which view each image is.

An x component of a parallel translation matrix of the pair of images is used as a direction of a difference component to determine each image view.

A method of determining views according to directions of the disparity vector may be changed according to whether a stereoscopic camera structure is a parallel structure or a cross structure. Each image view may be determined according to a direction of an occlusion region in order to supplement the method of determining views according to directions of the disparity vector.

The stereoscopic image is synchronized based on the result that the pair of first and second images is determined as one of the base view image and the additional view image (operation 1430).

In order to prevent an abrupt change in the time arrangement order, the stereoscopic image is stereo synchronized according to a view arrangement order of a pair of current images, a view arrangement order of a pair of previous images, and a view arrangement order of a pair of next images.

Also, if a changed view arrangement order is not reflected to the stereo synchronization of the stereoscopic image but instead some view arrangement orders of next images are observed and the changed view arrangement order is maintained, then the stereoscopic image is stereo synchronized based on the changed view arrangement order.

If a view arrangement order is given, a 2D image is reproduced, and a 3D image is reproduced, and a blank image is reproduced during the frames after reproduction of the 2D image is completed and while the 3D image is continued to be reproduced based on the given view arrangement order.

The present invention can be embodied as computer readable code on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, and the like, as would be understood by one of skill in the art.

Exemplary methods and apparatuses for determining stereo views of a stereoscopic image of the present invention can determine stereo views using a parallax between stereoscopic images of different views without requiring an additional hardware channel for stereo sync information additional to the image data.

Exemplary methods and apparatuses may perform a disparity estimation in units of blocks or lines in order to more exactly and efficiently determine a stereo view of the stereoscopic image and determines stereo views according to directions of a disparity vector. Directions of the disparity vector that can be changed according to a stereo camera structure may be specifically analyzed, thereby analyzing stereo views of various stereoscopic images.

Also, exemplary methods and apparatuses may prevent an abrupt view change based on the determined view image and performs stereo synchronization so as to reproduce the stereoscopic image, thereby reducing fatigue resulting from viewing a 3D stereo image.

Therefore, exemplary methods and apparatuses for determining stereo views of a stereoscopic image can reproduce a conventional stereoscopic image format without an inversion of left and right view images, and deliver a correct stereoscopic effect of the stereoscopic image without an additional channel or a toggle switch for a display device, and without requiring the manual operation of the toggle switch device by the user.

Exemplary methods and apparatuses may efficiently utilize 3D multimedia content and maximize a user's convenience when the user uses a 3D display device. Exemplary methods and apparatuses may utilize a 3D multimedia content display device in a conventional image display device, thereby promoting the 3D display device.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of determining stereo views of a stereoscopic image, the method comprising:
    selecting a pair of first and second images from frames of the stereoscopic image, wherein the selected pair of the first and second images comprises a left view image and a right view image and the first image and the second image are different views of a subject obtained by a first camera and a second camera, respectively;

performing a disparity estimation with regard to the first and second images by using a parallax between the pair of first and second images obtained by the first camera and the second camera;

determining a disparity vector for each of the plurality of corresponding blocks;

counting a number of positive directions of the disparity vectors and the number of negative directions of the disparity vectors;

determining a disparity vector of the first and second images to he in a positive direction if there is a greater number of disparity vectors of the plurality of corresponding blocks which are in the positive direction, and determining a disparity vector of the first and second images to be in a negative direction if there is a greater number of disparity vectors of the plurality of corresponding blocks which are in the negative direction; and determining which of the first image and the second image is the left view image and which of the first image and the second image is the right view image based on the determined disparity vector.

2. The method of claim 1, further comprising: synchronizing the frames of the stereoscopic image based on a result of the determining of which of the first image and the second image is the left view image and which of the first image and the second image is the right view image.

3. The method of claim 2, wherein an image comprises a pair of frames of the stereoscopic image which are a left view image and a right view image, and the selecting the pair of the first and second images comprises:

reconstructing the pair of the frames from the image; and selecting the pair of the frames as the pair of first and second images.

4. The method of claim 1, wherein the determining the disparity vector comprises:

obtaining a differential image in which a difference between a value of each pixel of the first image and a value of each corresponding pixel of the second image is recorded;

dividing the differential image into a plurality of blocks;

determining which of the plurality of blocks have a sum of absolute values of pixel values greater than a threshold value; and performing the disparity estimation based on the determined blocks.

5. The method of claim 4, wherein the determining which of the plurality of blocks have a sum of absolute values of pixel values greater than a predetermined threshold value comprises:

determining which blocks have the sum of absolute values of pixel values greater than the threshold value among blocks other than a block including a left edge area and a right edge area of the differential image.

6. The method of claim 4, wherein the performing the disparity estimation comprises:

determining, in the first image and in the second image, a current block location, a left block location that is shifted in parallel by a distance from the current block location to the left, and a right block location that is shifted in parallel by the distance from the current block location to the right, determining a first difference between pixels of the current block location of the first image and pixels of the left block location of the second image;

determining a second difference between the pixels of the current block location of the first image and pixels of the current block location of the second image;

determining a third difference between the pixels of the current block location of the first image and pixels of the right block location of the second image;

comparing the first, second, and third differences; and determining directions of the disparity vector based on a result of the comparing the first, second, and third differences.

7. The method of claim 6, wherein the determining the directions of the disparity vector comprises:

if the third difference is larger than the second difference and the second difference is larger than the first difference, determining a direction of the disparity vector to be in a negative direction; and if the first difference is larger than the second difference and the second difference is larger than the third difference, determining the direction of the disparity vector to be in a positive direction.

8. The method of claim 4, wherein the performing the disparity estimation comprises:

determining, in the first image and in the second image, a current line location with regard to pixels in a horizontal direction of a current block location and a search range including pixels that are shifted in parallel by a distance from the current line location in a left and right direction, determining differences between pixels of the current line location of the first image and pixels of a line location that is shifted in parallel from the current line location in a left or right direction within the search range of the second image;

comparing the determined differences; and determining the disparity vector to be in a direction of a line having a smallest difference based on a result of the comparing of the determined differences.

9. The method of claim 1, wherein, the stereoscopic image is obtained from a parallel camera, and the determining the views of the first and second images comprises:

determining the first image as the left view image and the second image as the right, view image if the direction of the disparity vector is positive; and determining the first image as the right view image and the second image as the left view image if the direction of the disparity vector is negative.

10. The method of claim 1, wherein, the stereoscopic image is obtained from a cross camera, and the determining the views of the first and second images comprises:

determining the first image as the left view image and the second image as the right view image if the direction of the disparity vector of an area before a cross point is positive and the direction of the disparity vector of an area after the cross point is negative; and determining the first image as the right view image and the second image as the left view image if the direction of the disparity vector of the area before the cross point is negative and the direction of the disparity vector of the area after the cross point is positive.

11. The method of claim 1, wherein the determining the views of the first and second images comprises:

determining that the stereoscopic image is obtained from a cross camera, if a perpendicular disparity occurs between the first and second images.

12. The method of claim 1, wherein the determining the views of the first and second images comprises:

detecting an occlusion region that is seen in one of the first and second images but is covered by a predetermined object in the other one of the first and second images;

determining that the image in which the occlusion region can be seen is obtained from a point camera ; and determining that the image in which the occlusion region is covered by the predetermined object is the view image.

13. The method of claim 3, further comprising:

determining a current view arrangement order of the first and second images, and if the current view arrangement order is different from previous view arrangement orders of a predetermined plurality of pairs of first and second images prior to the current pair of first and second images, synchronizing the stereoscopic image based on the previous view arrangement orders.

14. The method of claim 3, further comprising:

determining a current view arrangement order of the first and second images, and wherein the synchronizing of the stereoscopic image comprises: if the current view arrangement order is different from a previous view arrangement order of a pair of previous first and second images, and if the current view arrangement order is identical to subsequent view arrangement orders of a predetermined plurality of pairs of first and second images after the pair of current first and second images, synchronizing the stereoscopic image based on current view arrangement order.

15. The method of claim 3, further comprising:

determining a current view arrangement order of the first and second images, and wherein the synchronizing of the stereoscopic image comprises: if a view arrangement order of a pair of first and second images after the predetermined plurality of pairs of first and second images is identical to the current view arrangement order, synchronizing the stereoscopic image based on the current view arrangement.

16. The method of claim 2, wherein the synchronizing of the stereoscopic image comprises:

if the frames of the stereoscopic image follow frames of a two-dimensional (2D) image, inserting a predetermined number of blank frames between a last frame of the 2D image and a first frame of the stereoscopic image; and synchronizing the stereoscopic image based on a view arrangement order of a pair of first and second images after the blank frames.

17. A method of determining stereo views of a stereoscopic the method comprising:

selecting a pair of first and second images from frames of the stereoscopic image, wherein the selected pair of the first and second images comprises a left view image and a right view image and the first image and the second image are different views of a subject obtained by a first camera and a second camera, respectively; and extracting, from stereoscopic image data, a first camera parameter for the first image and a second camera parameter for the second image;

extracting a first parallel translation matrix of the first image from the first camera parameter and a second parallel translation matrix of the second image from the second camera parameter;

comparing a component x1 of the first parallel translation matrix and a component x2 of the second parallel translation matrix to determine a parallax between the pair of first and second images obtained by the first camera and the second camera; and determining which of the first image and the second image is the left view image and which of the first image and the second image is the right view image based on a result of the comparing, wherein the first and second parallel translation matrices indicate how far spatially corresponding coordinates of the first and second images are away from each other with regard to a predetermined world coordinate.

18. The method of claim 17, wherein the determining the views of the first and second images comprises:

if the component x1 is greater than the component x2, determining that the first image is the right view image and the second image is the left view image; and if the component x2 is greater than the component x1, determining that the first image is the left view image and the second image is the right view image.

19. The method of claim 17, wherein the determining which of the first image and the second image is the left view image and which of the first image and the second image is the right view image comprises: extracting, from the stereoscopic image, a first camera parameter for the first image and a second camera parameter for the second image and determining which of the first image and the second image is the left view image and which of the first image and the second image is the right view image by using the first and second camera parameters.

20. The method of claim 17, further comprising: synchronizing the frames of the stereoscopic image based on a result of the determining of which of the first image and the second image is the left view image and which of the first image and the second image is the right view image.

21. The method of claim 18, wherein an image comprises a pair of frames of the stereoscopic image which are a left view image and a right view image, and the selecting the pair of the first and second images comprises:

reconstructing the pair of the frames from the image; and selecting the pair of the frames as the pair of first and second images.

22. The method of claim 21, further comprising:

determining a current view arrangement order of the first and second images, and if the current view arrangement order is different from previous view arrangement orders of a predetermined plurality of pairs of first and second images prior to the current pair of first and second images, synchronizing the stereoscopic image based on the previous view arrangement orders.

23. The method of claim 21, further comprising:

determining a current view arrangement order of the first and second images, and wherein the synchronizing of the stereoscopic image comprises: if the current view arrangement order is different from a previous view arrangement order of a pair of previous first and second images, and if the current view arrangement order is identical to subsequent view arrangement orders of a predetermined plurality of pairs of first and second images after the pair of current first and second images, synchronizing the stereoscopic image based on current view arrangement order.

24. The method of claim 21, further comprising:

determining a current view arrangement order of the first and second images, and wherein the synchronizing of the stereoscopic image comprises: if a view arrangement order of a pair of first and second images after the predetermined plurality of pairs of first and second images is identical to the current view arrangement order, synchronizing the stereoscopic image based on the current view arrangement.

25. The method of claim 20, wherein the synchronizing of the stereoscopic image comprises:
if the frames of the stereoscopic image follow frames of a two-dimensional (2D) image, inserting a predetermined number of blank frames between a last frame of the 2D image and a first frame of the stereoscopic image; and
synchronizing the stereoscopic image based on a view arrangement order of a pair of first and second images after the blank frames.

26. An apparatus for determining stereo views of a stereoscopic image, the apparatus comprising:
an image selecting unit which selects a pair of first and second images from frames of the stereoscopic image, wherein the selected pair of the first and second images comprises a left view image and a right view image and the first image and the second image are two different views of a subject obtained by a first camera and a second camera, respectively; and
a view determining unit which performs a disparity estimation with regard to the first and second images by using a parallax between the pair of first and second images obtained by the first camera and the second camera, determines a disparity vector for each of the plurality of corresponding blocks, counts a number of positive directions of the disparity vectors and the number of negative directions of the disparity vectors, determines a disparity vector of the first and second images to be in a positive direction if there is a greater number of disparity vectors of the plurality of corresponding blocks which are in the positive direction, determines a disparity vector of the first and second images to be in a negative direction if there is a greater number of disparity vectors of the plurality of corresponding blocks which are in the negative direction, and determines which of the first image and the second image is the left view image and which of the first image and the second image is the right view image based on the determined disparity vector.

27. The apparatus of claim 26, further comprising:
a stereo synchronizing unit which synchronizes the frames of the stereoscopic image based on a result of the determination of which of the first image and the second image is the left view image and which of the first image and the second image is the right view image.

28. The apparatus of claim 26, wherein an image comprises a pair of frames of the stereoscopic image which are a left view image and an right view image, and
the image selecting unit reconstructs the pair of the frames from the image, and selects the pair of frames as the pair of first and second images.

29. The apparatus of claim 26, wherein the disparity vector determining unit comprises:
a differential image obtaining unit which obtains a differential image in which a difference between a value of each pixel of the first image and a value of each corresponding pixel of the second image is recorded; and
a block determining unit which divides the differential image into a plurality of blocks and determines which of the plurality of blocks has a sum of absolute values of pixel values greater than a threshold value; and
a disparity estimation performing unit which performs the disparity estimation based on the determined block.

30. The apparatus of claim 29, wherein the block determining unit determines which blocks have the sum of absolute values of pixel values greater than the threshold value among blocks other than a block including a left edge area and a right edge area of the differential image.

31. The apparatus of claim 29, wherein the disparity vector determining unit determines, in the first image and the second image, a current block location, a left block location that is shifted in parallel by a distance from the current block location to left, and a right block location that is shifted in parallel by the distance from the current block location to right, and the disparity vector determining unit further comprises:
a first difference determining unit which determines a first difference between pixels of the current block location of the first image and pixels of the left block location of the second image,
a second difference determining unit which determines a second difference between the pixels of the current block location of the first image and pixels of the current block location of the second image;
a third difference determining unit which determines a third difference between the pixels of the current block location of the first image and pixels of the right block location of the second image;
a difference comparing unit which compares the first, second, and third differences; and
wherein the disparity vector direction determining unit determines directions of the disparity vector according to a result of the comparison of the first, second, and third differences by the difference comparing unit.

32. The apparatus of claim 31, wherein, if the third difference is larger than the second difference and the second difference is larger than the first difference, the disparity vector direction determining unit determines the disparity vector to be in a negative direction, and if the first difference is larger than the second difference and the second difference is larger than the third difference, the disparity vector direction determining unit determines the disparity vector to be in a positive direction.

33. The apparatus of claim 29, wherein the disparity estimation performing unit determines, in the first image and in the second image, a current line location with regard to pixels in a horizontal direction of a current block location and a search range including pixels that are shifted in parallel by a distance from the current line location in a left and right direction, and the disparity estimation performing unit comprises:
a difference determining unit which determines differences between pixels of the current line location of the first image and pixels of a line location that is shifted in parallel from the current line location in a left or right direction within the search range of the second image;
a difference comparing unit which compares the determined differences; and
wherein the disparity vector direction determining unit determines the disparity vector to be in a direction of a line having the smallest difference based on a result of the comparison of the determined differences by the difference comparing unit.

34. The apparatus of claim 26, wherein, the stereoscopic image is obtained from a parallel camera, and
the view determining unit determines the first image as the left view image and the second image as the right view image if the direction of the disparity vector is positive, and determines the first image as the right view image and the second image as the left view image if the direction of the disparity vector is negative.

35. The apparatus of claim 26, wherein, the stereoscopic image is obtained from a cross camera, with regard to a cross point of the cross camera, and the view determining unit determines the first image as the left view image and the second image as the right view image if the direction of the disparity vector of an area before the cross point is positive and the direction of the disparity vector of an area after the cross point is negative, and determines the first image as the right view image and the second image as the left view image if the direction of the disparity vector of the area before the cross point is negative and the direction of the disparity vector of the area after the cross point is positive.

36. The apparatus of claim 26, wherein the view determining unit determines that the stereoscopic image is obtained from the cross camera if a perpendicular disparity occurs between the first and second images.

37. The apparatus of claim 26, wherein the view determining unit comprises:
   an occlusion region detecting unit which detects an occlusion region that can be seen in one of the first and second images but it is covered by a predetermined object in the other one of the first and second images;
   an occlusion region based view determining unit which determines that the image in which the occlusion region can be seen is obtained from a point camera and determines that the image in which the occlusion region is covered by the predetermined object is the view image.

38. The apparatus of claim 28, further comprising: a stereo synchronizing unit which:
   determines a current view arrangement order of the first and second images; and
   if the current view arrangement order is different from previous view arrangement orders of a predetermined plurality of pairs of first and second images previous to the pair of current first and second images, the stereo synchronizing unit synchronizes the stereoscopic image based on the previous view arrangement orders.

39. The apparatus of claim 28, further comprising: a stereo synchronizing unit which:
   determines a current view arrangement order of the first and second images; and
   if the current view arrangement order is different from a previous view arrangement order of a pair of previous first and second images, and a subsequent view arrangement order of a predetermined plurality of pairs of first and second images after the pair of current first and second images is identical to the current view arrangement order,
   the stereo synchronizing unit synchronizes the stereoscopic image based on the current view arrangement order.

40. The apparatus of claim 28, further comprising: a stereo synchronizing unit which:
   determines a current view arrangement order of the first and second images; and
   if a view arrangement order of a pair of first and second images after the predetermined plurality of pairs of first and second images identical to the current view arrangement order,
   the stereo synchronizing unit synchronizes the stereoscopic image based on the current view arrangement order.

41. The apparatus of claim 27, wherein, if the frames of the stereoscopic image follow frames of a two-dimensional (2D) image, the stereo synchronizing unit inserts a predetermined number of blank frames between a last frame of the 2D image and a first frame of the stereoscopic image, and synchronizes the stereoscopic image based on a view arrangement order of a pair of first and second images after the blank frames.

42. An apparatus for determining stereo views of a stereoscopic image. the apparatus comprising:
   an image selecting unit which selects a pair of first and second images from frames of the stereoscopic image, wherein the selected pair of the first and second images comprises a left view image and a right view image and the first image and the second image are two different views of a subject obtained by a first camera and a second camera respectively;
   a camera parameter extracting unit which extracts, from stereoscopic image data, a first camera parameter for the first image and a second camera parameter for the second image;
   a parallel translation matrix extracting unit which extracts a first parallel translation matrix of the first image from the first camera parameter and a second parallel translation matrix of the second image from the second camera parameter;
   an x component comparing unit which compares a component x1 of the first parallel translation matrix and a component x2 of the second parallel translation matrix to determine a parallax between the pair of first and second images obtained by the first camera and the second camera, and determines which of the first image and the second image is the left view image and which of the first image and the second image is the right view image based on a result of the comparison of the component x1 and the component x2,
   wherein the first and second parallel translation matrices indicate how far spatially corresponding coordinates of the first and second images are away from each other with regard to a predetermined coordinate.

43. The apparatus of claim 42, wherein,
   if the component x1 is greater than the component x2, the view determining unit determines that the first image is the right view image and that the second image is the view image, and
   if the component x2 is greater than the component x1, the view determining unit determines that the first image is the left view image and that the second image is the right view image.

44. The apparatus of claim 42, wherein the view determining unit comprises a camera parameter extracting unit which extracts, from the stereoscopic image, a first camera parameter for the first image and a second camera parameter for the second image, and the view determining unit determines which of the first image and the second image is the left view image and which of the first image and the second image is the right view image by using the first and second camera parameters.

45. A non-transitory computer readable recording medium having recorded thereon a program for executing the method of claim 1.

* * * * *